(12) United States Patent
Chen et al.

(10) Patent No.: US 8,557,143 B2
(45) Date of Patent: Oct. 15, 2013

(54) ELECTROLUMINESCENT ZNS:MN PHOSPHOR AND METHOD OF MAKING

(75) Inventors: Xianzhong Chen, Sayre, PA (US);
Shellie Kaye Northrop, Sayre, PA (US);
Chen-Wen Fan, Sayre, PA (US)

(73) Assignee: Global Tungsten and Powders Corp., Towanda, PA (US)

( * ) Notice: Subject to any disclaimer, the term of this patent is extended or adjusted under 35 U.S.C. 154(b) by 350 days.

(21) Appl. No.: 12/402,019

(22) Filed: Mar. 11, 2009

(65) Prior Publication Data

US 2009/0230357 A1    Sep. 17, 2009

Related U.S. Application Data

(60) Provisional application No. 61/036,118, filed on Mar. 13, 2008.

(51) Int. Cl.
*C09K 11/54* (2006.01)
*C09K 11/56* (2006.01)

(52) U.S. Cl.
USPC .................................................. 252/301.6 S

(58) Field of Classification Search
USPC .................................................. 252/301.6 S
See application file for complete search history.

(56) References Cited

U.S. PATENT DOCUMENTS

| | | | |
|---|---|---|---|
| 2,396,298 A * | 3/1946 | Swanson | 252/301.6 S |
| 2,646,440 A * | 7/1953 | Kary | 556/65 |
| 3,028,339 A * | 4/1962 | Inoue et al. | 252/301.6 S |
| 3,062,750 A * | 11/1962 | Umberger et al. | 252/301.6 S |
| 3,984,586 A * | 10/1976 | Kawarada et al. | 427/64 |
| 5,498,369 A | 3/1996 | Bredol et al. | |
| 6,090,200 A * | 7/2000 | Gray et al. | 117/68 |
| 6,113,977 A | 9/2000 | Soininen et al. | 427/64 |
| 6,379,583 B1 * | 4/2002 | Gray et al. | 252/301.4 R |
| 6,558,575 B2 * | 5/2003 | Andriessen et al. | 252/301.6 S |
| 6,733,739 B2 | 5/2004 | Vecht et al. | |
| 6,787,064 B2 | 9/2004 | Andriessen | |
| 7,067,071 B1 * | 6/2006 | Kappe et al. | 252/301.6 S |
| 7,157,845 B2 | 1/2007 | Chen | 313/485 |
| 7,176,616 B2 | 2/2007 | Yamashita | |
| 2001/0043889 A1 * | 11/2001 | Downs et al. | 422/168 |
| 2006/0066208 A1 | 3/2006 | Chen | 313/485 |
| 2006/0220546 A1 | 10/2006 | Chen et al. | 313/509 |

OTHER PUBLICATIONS

Rema Devi et al, "Synthesis and Chacterization of Mn2+-doped ZnS nanoparticles", Pramana-journal of physics, vol. 68, No. 4, Apr. 2007, pp. 679-687.*
International Search Report, International Application No. PCT/US2009/036916, Sep. 24, 2009.
Written Opinion, International Application No. PCT/US2009/036916, Sep. 24, 2009.
International Search Report, International Application No. PCT/US2009/035313, Apr. 29, 2009.
Written Opinion, International Application No. PCT/US2009/035313, Apr. 29, 2009.

* cited by examiner

*Primary Examiner* — Carol M Koslow
(74) *Attorney, Agent, or Firm* — Ballard Spahr LLP

(57) ABSTRACT

An electroluminescent phosphor comprising ZnS:Mn is disclosed. Also disclosed are ZnS:Mn electroluminescent phosphors that are free of or substantially free of copper, and/or wherein the phosphor has a D50 size of less than about 5 μm. In addition, a method for preparing a ZnS:Mn phosphor is disclosed, comprising the steps of contacting at least a portion of each of a first solution comprising a $Zn^{2+}$ compound, a manganese source, and a second solution comprising a $S^{2-}$ source agent; and then heating the mixture at a temperature and for a time sufficient to form a phosphor.

7 Claims, 2 Drawing Sheets

ELECTROLUMINESCENT ZNS:MN PHOSPHOR AND METHOD OF MAKING

CROSS REFERENCE TO RELATED APPLICATIONS

This application claims priority to U.S. Provisional Application Ser. No. 61/036,118, filed Mar. 13, 2008, which is hereby incorporated by reference.

BACKGROUND OF THE INVENTION

1. Field of the Invention

The present invention relates to zinc sulfide based electroluminescent (EL) phosphors, and specifically to small particle size ZnS:Mn EL phosphors not containing Cu.

2. Technical Background

Manganese activated zinc sulfide electroluminescent phosphors (ZnS:Mn) can emit orange-yellow light. Recent interest in electroluminescent devices, specifically in AC driven electroluminescent devices, has resulted in increased interest in small sized ZnS:Mn phosphors.

Conventional methods for preparing ZnS:Mn phosphors are either inefficient or use hazardous materials such as hydrogen sulfide.

It would be advantageous to have manganese activated zinc sulfide electroluminescent phosphors with small particle sizes and efficient, less-hazardous methods for making such phosphors.

Thus, there is a need to address the aforementioned problems and other shortcomings associated with the traditional manganese activated zinc sulfide electroluminescent phosphor materials. These needs and other needs are satisfied by the compositions and methods of the present invention.

SUMMARY OF THE INVENTION

The present invention relates to zinc sulfide based electroluminescent (EL) phosphors, and specifically to orange yellow emitting, small particle size manganese activated EL phosphors comprising no copper.

In a first aspect, the present invention provides an electroluminescent phosphor comprising ZnS:Mn.

In a second aspect, the present invention provides an electroluminescent phosphor comprising ZnS:Mn and that is free of or substantially free of copper.

In a third aspect, the present invention provides an electroluminescent phosphor comprising ZnS:Mn, wherein the phosphor has a D50 size of less than about 5 μm.

In a fourth aspect, the present invention provides a method for preparing a ZnS:Mn phosphor comprising the steps of contacting at least a portion of each of a first solution comprising a $Zn^{2+}$ compound, a manganese source, and a second solution comprising a $S^{2-}$ source agent; and then heating the mixture at a temperature and for a time sufficient to form a phosphor.

Additional aspects and advantages of the invention will be set forth, in part, in the detailed description, figures, and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the present invention and together with the description, serve to explain, without limitation, the principles of the invention. Like numbers represent the same elements throughout the figures.

DETAILED DESCRIPTION OF THE INVENTION

Figure 1:
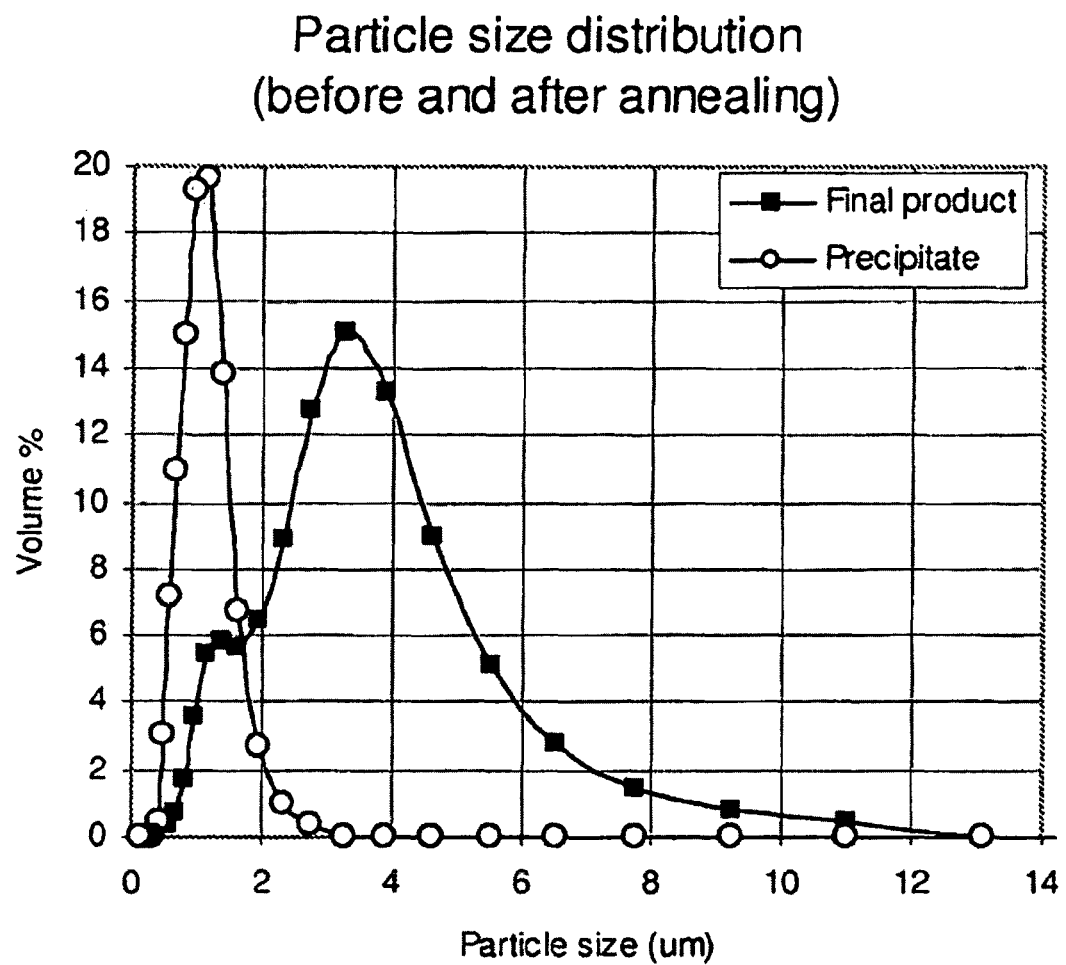
FIG. 1 is a graph of the particle size distributions before and after annealing for a precipitate prepared in Example 1, in accordance with various aspects of the present invention.

The present invention can be understood more readily by reference to the following detailed description, drawings, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its currently known embodiments. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination embodiment, A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "component" includes aspects having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optionally present component" means that the component can or can not be present and that the description includes both aspects of the invention where the optional component is present and where the optional component is not present.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, refers to the ratio of the weight of the component to the total weight of the composition in which the component is included, expressed as a percentage.

As used herein, references to particle size and/or particle size distribution, unless specifically stated to the contrary, are intended to refer to a volume distribution.

As used herein, the D50 value of a phosphor material is the particle size at which the cumulative volume of particles reaches 50%.

The following US Patents and published applications describe various compositions and methods for electroluminescent phosphor materials, and they are hereby incorporated by reference in their entirety and for the specific purpose of disclosing materials and methods relating to the preparation of electroluminescent phosphor materials: U.S. Pat. Nos. 5,498,369; 6,787,064; 6,733,739; and 7,176,616.

As briefly introduced above, the present invention provides manganese activated zinc sulfide electroluminescent phosphor materials having small particle sizes and comprising no copper.

Manganese activated zinc sulfide phosphors can conventionally be prepared by heating bulk zinc sulfide and manganese sulfide, or other manganese containing compounds such as manganese carbonate, at high temperatures. Such manganese activated zinc sulfide phosphor materials can also be prepared by co-precipitating zinc sulfide and manganese sulfide, and then annealing the co-precipitate at high temperatures.

As described above, it can be desirable in certain applications to produce manganese activated zinc sulfide (ZnS:Mn) electroluminescent phosphor materials having a small particle size. In either conventional preparation method, having small ZnS precipitates and/or ZnS:Mn co-precipitates before high temperature treatment are necessary to prepare small particle size ZnS:Mn phosphors.

One conventional method to form a ZnS precipitate or ZnS:Mn co-precipitate is to bubble hydrogen sulfide gas ($H_2S$) into a solution comprising a $Zn^{2+}$ salt, such as, for example, zinc sulfate or zinc acetate. As hydrogen sulfide is poisonous and can present a fire hazard, this approach suffers from safety concerns. In addition, the continuously dissociated $H^+$ ions from the hydrogen sulfide can lower the pH of the solution, making precipitation of MnS more difficult. Such a lowered pH can, in various aspects, result in an unstable colloidal suspension due to, for example, isoelectric effects, inhomogeneous precipitates, and decreased yield of the desired phosphor.

Another conventional preparation method comprises the use of a $Zn^{2+}$ salt, a $Na_2S$ solution, ethylenediamine tetraacetic acid (EDTA), and other reagents. Still other conventional preparation methods utilize thiourea dioxide. These methods can produce suitable ZnS particles, but are inefficient. For example, in a thiourea dioxide method, most of the sulfur atoms present form sulfite anions, while only about ⅙ of the sulfur atoms form ZnS.

In addition, conventional electroluminescent phosphor powders typically comprise copper as an activator and/or chloride as a co-activator. Upon addition of manganese, a yellow-orange electroluminescent phosphor, such as, for example, ZnS:Cu,Mn,Cl, can be formed.

Further, the particle size of conventional electroluminescent phosphor powders ranges from 20 to 35 μm. Such conventional phosphors can be used to produce electroluminescent lamps having a thickness of about 50 μm. Under typical operative voltages of about 100 V, the electric field within an electroluminescent particle of such a lamp will be about $2\times10^4$ (100 V/50 μm), too low for the efficient generation of electroluminescent light. While not wishing to be bound by theory, the addition of copper to such conventional electroluminescent phosphor powders can form very thin $Cu_2S$ needles in crystal defect areas. These copper sulfide needles can have a diameter of about 40 nm, and the sharp needle tips can create a much stronger electric field, such as in the vicinity of $10^6$ V/cm. Thus, the addition of copper can be important to achieving light emission in conventional electroluminescent phosphors.

One of the potential drawbacks of using copper in a conventional electroluminescent phosphor is that copper within such a phosphor can have a high mobility and diffusion rate, reducing the phosphor life time. To achieve emission without copper addition, a variety of approaches have been explored, including increasing the operating voltage to about 200 V or higher to increase the electric field. Even at these higher operative voltages, conventional electroluminescent powders will not emit electroluminescent light if copper is not used as an activator.

In contrast, using thin-film electroluminescent phosphor technology of the present invention, such as, for example, films less than about 1μm thick, a ZnS:Mn phosphor can exhibit a brightness hundreds of times greater than a conventional electroluminescent powder lamp. Thus, a ZnS:Mn powder having a small particle size can provide, in various aspects, a thin-film electroluminescent device, or other device comprising a material between a thin-film and a conventional thick-film powder, capable of a brightness greater than would be otherwise attainable with conventional materials. The absence of copper can, in various aspects, provide enhanced brightness without adversely affecting phosphor lifetime.

In various aspects, the present invention provides a simplified method for preparing a zinc sulfide precipitate using $Na_2S$ and a zinc salt, without the need for hydrogen sulfide and other organic chemicals. Moreover, in various aspects, such a precipitate can be used to make a ZnS:Mn phosphor having a D50 of less than about 5µm.

In various aspects, the present invention provides a method for preparing a ZnS:Mn precipitate and then heating the precipitate to at least partially anneal the precipitate and form a phosphor material. Preparation of Reagents In general, the various methods of the present invention comprise contacting a zinc salt, such as, for example zinc sulfate, zinc acetate, or a combination thereof; with a manganese containing compound, such as, for example, manganese sulfate, to form a mixture; and then contacting the mixture with a solution comprising a $S^{2-}$ source agent, such as, for example, $Na_2S$.

In one aspect, a solution comprising zinc and manganese can be prepared. In another aspect, separate solutions comprising zinc and manganese can be prepared and subsequently mixed. In another aspect, stock solutions can be prepared of one or more of the reagents (e.g., zinc, manganese) that can be diluted or used directly in subsequent steps.

In various aspects, each of the solutions described herein can comprise a varying concentration. While various concentration values and ranges are recited herein for each solution, the present invention is not intended to be limited to any particular concentration value or range. In one aspect, any of the solutions described herein can comprise a concentration higher than that specifically recited. In another aspect, any of the solutions described herein can comprise a concentration lower than that specifically recited, and such lower concentration solution can, in various aspects, be preferred for producing smaller particles, although the precipitation process using such lower concentration solution can take a longer period of time to complete.

In one aspect, a zinc stock solution can be prepared. In one aspect, the solution is an aqueous solution. In another aspect, the solution comprises water and optionally other components. In yet another aspect, the solution is non-aqueous. In a preferred aspect, the solution is an aqueous solution.

A zinc stock solution, if prepared, can comprise any zinc compound and concentration suitable for use in preparing a phosphor material. In various aspects, the zinc compound can comprise at least one of zinc sulfate, zinc acetate, zinc oxide or a combination thereof. In another aspect, the zinc compound can comprise a water soluble or at least partially water soluble zinc compound. In still other aspects, the zinc compound can comprise a partially water soluble zinc compound. In one aspect, if one or more zinc compounds are not soluble or substantially soluble in the solution, one or more additional components can be added to facilitate dissolution of the zinc compound.

In another aspect, a zinc stock solution can be prepared by contacting an amount of zinc oxide with water, such as, for example, cold deionized water, and then adding an acid to the resulting mixture. In a specific aspect, a mixture of zinc oxide and water can be prepared and a sulfur containing acid, such as sulfuric acid, slowly added to the mixture. In one aspect, such an acid can comprise sulfuric acid. The concentration of an acid, if used, can vary depending on the specific compounds and desired concentrations, and one of skill in the art could readily determine an appropriate acid concentration. In a specific aspect, an amount of concentrated sulfuric acid is added to a mixture of zinc oxide and water to form a zinc sulfate solution. In another aspect, a mixture and/or solution comprising a zinc compound can be agitated to ensure mixing of the components. In yet another aspect, the mixture and/or solution can be subjected to other means for mixing, such as, for example, stirring, shaking, and/or sonification.

The concentration of a zinc stock solution, if prepared, can be any concentration suitable for use in preparing a phosphor material. In various aspects, the concentration of one or more zinc compounds in a stock solution can be from about 1 to about 45 wt. %, for example, about 1, 2, 3, 4, 5, 6, 7, 8, 10, 12, 14, 16, 18, 20, 22, 24, 26, 28, 30, 33, 36, 39, 41, 43, or 45 wt. %. It should be noted that the specific concentration of a zinc compound can vary depending upon the specific compound and, for example, molecular weight thereof. In another aspect, a zinc stock solution comprises from about 1 to about 16 wt. % of Zn (on an elemental basis), for example, about 1, 2, 3, 4, 5, 6, 7, 8, 9, 10, 11, 12, 13, 14, 15, or 16 wt. % Zn; or from about 5 to about 11 wt. %, for example, about 5, 6, 7, 8, 9, 10, or 11 wt. % of Zn on an elemental basis. In a specific aspect, a zinc stock solution can comprise about 19 wt. % $ZnSO_4$, or about 8 wt. % on a Zn elemental basis. In one aspect, the concentration of a zinc stock solution is sufficiently low to prevent the formation of large particles, such as, for example, greater than about 5µm, when contacted with a $Na_2S$ solution. In another aspect, the concentration of a stock solution can initially be higher than the desired concentration, and can be subsequently reduced by, for example, dilution, to the target concentration.

Similarly, in another aspect, a manganese stock solution can be prepared. In one aspect, the manganese stock solution is an aqueous solution. In another aspect, the manganese stock solution comprises water and optionally other components. In yet another aspect, the manganese stock solution is non-aqueous. In a preferred aspect, the manganese stock solution is an aqueous solution.

A manganese stock solution, if prepared, can comprise any manganese compound and concentration suitable for use in preparing a phosphor material. In various aspects, the manganese compound can comprise at least one of manganese sulfate, manganese chloride, manganese nitrate, manganese acetate, or a combination thereof. In another aspect, the manganese compound can comprise a water soluble or at least partially water soluble manganese compound. In still other aspects, the manganese compound can comprise a partially water soluble manganese compound or a water insoluble manganese compound. In one aspect, if one or more manganese compounds are not soluble or substantially soluble in the solution, one or more additional components can be added to facilitate dissolution of the manganese compound.

In a specific aspect, an amount of manganese sulfate, such as, for example, a hydrated manganese sulfate, can be dissolved in cold deionized water. If necessary, the resulting solution can be mixed or agitated to ensure dissolution of the manganese compound.

The concentration of a manganese stock solution, if prepared, can be any concentration suitable for use in preparing a phosphor material. In various aspects, the concentration of one or more manganese compounds in a stock solution can be from about 5 to about 45 wt. %, for example, about 5, 6, 7, 8, 9, 11, 13, 15, 17, 19, 21, 23, 25, 27, 29, 31, 33, 35, 37, 39, 41, 43, or 45 wt. %. In another aspect, the concentration fo a manganese stock solution can comprise from about 1 to about 16 wt. % of Mn (on an elemental basis), for example, about 1, 2, 3, 4, 5, 6, 7, 8, 9, 10, 11, 12, 13, 14, 15, or 16 wt. % Mn; or from about 5 to about 11 wt. %, for example, about 5, 6, 7, 8, 9, 10, or 11 wt. % of Mn on an elemental basis. In a specific aspect, a zinc stock solution can comprise about 22 wt. %

MnSO$_4$, or about 8 wt. % on a Mn elemental basis. In one aspect, the concentration of a manganese stock solution is sufficiently low to prevent the formation of large particles, such as, for example, greater than about 5µm, when contacted with a Na$_2$S solution. In another aspect, the concentration of a stock solution can initially be higher than the desired concentration, and can be subsequently reduced by, for example, dilution, to the target concentration.

The zinc and manganese solutions can optionally be combined to form a stock solution comprising zinc and manganese compounds. If combined, the individual components and concentrations of each of the zinc and/or manganese solutions can vary, and it is not necessary that they comprise the same components and/or concentrations. In one aspect, a zinc sulfate solution and a manganese sulfate solution are combined. In one aspect, a zinc solution and a manganese solution can be combined, wherein the Zn:Mn molar ratio can be from about 27:1 to about 122:1: for example about 27:1, 29:1, 31:1, 33:1, 35:1, 37:1, 40:1, 43:1, 46:1, 49:1, 50:1, 55:1, 60:1, 65:1, 70:1, 75:1, 80:1, 85:1, 90:1, 95:1, 100:1, 105:1, 110:1, 115:1, 118:1, 119:1, 120:1, 121:1, or 122:1. In one aspect, the Zn:Mn molar ratio should be significantly larger than about 1. In another aspect, a zinc solution and a manganese solution can be combined, wherein the Zn:Mn weight ratio can be from about 33:1 to about 133:1, for example, about 33:1, 35:1, 37:1, 39:1, 41:1, 45:1, 49:1, 51:1, 55:1, 60:1, 65:1, 70:1, 75:1, 80:1, 85:1, 90:1, 95:1, 100:1, 105:1, 110:1, 115:1, 120:1, 125:1, 128:1, 129:1, 130:1, 131:1, 132:1, or 133:1. In other aspects, the molar and/or weight ratio of Zn:Mn can be less than or greater than the values and ranges specifically recited herein.

The present invention further comprises a solution comprising a S$^{2-}$ source agent, such as, for example, Na$_2$S. The individual components and concentrations of a S$^{2-}$ source agent solution can vary depending on the other components and desired properties of a precipitate or final phosphor product, and one of skill in the art could readily select or prepare an appropriate S$^{2-}$ source agent solution. In one aspect, a S$^{2-}$ source agent can comprise any one or more alkali sulfide and/or ammonium sulfide solutions comprising a sulfide anion, such as, for example, from about 3 to about 4 weight percent sulfide anion. Na$_2$S and solutions comprising Na$_2$S can be safely handled, alleviating some of the concerns over conventional methods using hydrogen sulfide gas. In one aspect, a S$^{2-}$ source agent solution does not comprise hydrogen sulfide gas.

The concentration of a sulfide agent can vary, depending upon the concentration of other solutions as described herein, the desire particle size, and other factors. One of skill in the art could readily select an appropriate S$^{2-}$ source agent concentration for use in the various aspects of the present invention, and the present invention is not intended to be limited to any particular S$^{2-}$ source agent concentration. In one aspect, a S$^{2-}$ source agent can comprise from about 3 to about 4 wt. % of sulfide anion. In another aspect, a S$^{2-}$ source agent comprises from about 7 to about 9 wt. % Na$_2$S.

In one aspect, the S$^{2-}$ source agent solution can be prepared by contacting an amount sodium sulfide and/or a hydrated sodium sulfide in water. In a specific aspect, an amount of Na$_2$S·xH$_2$O, wherein x is about 3.7, is dissolved in hot deionized water to form a S$^{2-}$ source agent solution.

Preparation of ZnS:Mn Precipitate

A ZnS:Mn precipitate can be prepared by contacting a zinc containing solution, a manganese containing solution, and a S$^{2-}$ source agent. The specific components and concentrations of each of the zinc containing solution, manganese containing solution, and S$^{2-}$ source agent can vary, and one of skill in the art could, in possession of this disclosure, determine a suitable component and/or concentration for each of the solutions.

In one aspect, a portion of at least one of the zinc containing solution and/or the manganese containing solution are contacted with at least a portion of a S$^{2-}$ source agent in a controlled manner. In another aspect, a zinc containing solution or a portion thereof is contacted with a S$^{2-}$ source agent to form a precipitate and the resulting precipitate can be subsequently contacted with a manganese source prior to heating. In yet another aspect, each of a zinc containing solution, a manganese containing solution, and a S$^{2-}$ source, or portions thereof, are contacted prior to heating. The order of contacting can vary and the present invention is not intended to be limited to any particular order of contacting. In another aspect, at least a portion of each of the zinc containing solution, manganese containing solution, and S$^{2-}$ source agent are contacted simultaneously. In yet another aspect, a portion of each of the solutions is contacted via a controlled addition, such as for example, from a burette, metering pump, or dosimeter. In still another aspect, the zinc containing solution and manganese containing solution are combined, as described herein, and can be contacted with the S$^{2-}$ source agent. The specific method of contacting can vary, and the present invention is not intended to be limited to any specific method of contacting, provided that the method is capable of controlling the rate of contacting so as to produce a ZnS:Mn precipitate having a controlled particle size.

In various aspects, the rate at which each of the solutions are contacted can vary depending on, for example, the concentration of the solutions, volume into which a precipitate is formed, environmental conditions, and desired particle size. In various aspects, the rate of the precipitation reaction can be controlled so as to produce from about 10 g to about 100 g of ZnS:Mn, for example, about 10, 15, 20, 23, 25, 28, 31, 35, 37, 39, 42, 45, 50, 55, 59, 63, 67, 70, 72, 74, 77, 80, 93, 87, 91, 94, 97, or 100 g of ZnS:Mn per hour; or from about 30 g to about 55 g, for example, about 30, 32, 34, 36, 38, 40, 42, 44, 46, 48, 50, 52, 54, or 55 g of ZnS:Mn per hour. In a specific aspect, the rate of a precipitation reaction is controlled so as to produce about 42 g of ZnS:Mn per hour.

In another aspect, each of the S$^{2-}$ source agent solution, the zinc containing solution, the manganese containing solution, or a combination thereof can be contacted by adding a portion thereof to a quantity of, for example, hot water. In a specific example, each of a combined zinc/manganese containing solution and sodium sulfide solution can be added in a controlled manner to a vessel containing hot deionized water. In various aspects, the solutions or any portion thereof can be contacted directly with another and/or can be contacted in and/or with another solution, such as, for example, a water diluent.

In one aspect, the rate of contacting or addition of each of the solutions is maintained such that during contacting, no or substantially no excess of Zn$^{2+}$ ions or S$^{2-}$ ions, relative to each other, exist in the resulting solution. In such as aspect, the concentration of Zn$^{2+}$ and S$^{2-}$ ions remains low during the contacting process.

A ZnS:Mn precipitate, once formed, can be separated from the supernate by, for example, allowing the precipitate to settle and/or centrifugation. In various aspects, the precipitate, can be washed with water, for example, deionized water to remove any unreacted components or by-products. One or more individual washing steps can be performed on all or a portion of a precipitate. In a specific aspect, a precipitate is washed until the wash solution (e.g., decanted supernate) exhibits a conductivity of less than about 200 µm·cm$^{-1}$ is reached. In another aspect, a precipitate is washed until the concentration of $Na^+$ and/or $SO_4^{2-}$ ions is sufficiently low to not affect particle growth during a subsequent annealing step.

After washing, a precipitate can, in various aspects, be dried. Any drying technique suitable for use with a phosphor material can be used. In various aspects, a precipitate can be dried in air, in an oven or furnace, or by a freeze drying technique. In a specific example, a washed precipitate is dried in a freeze drier for 24 to 48 hours.

A ZnS:Mn precipitate, prior to annealing, can have a particle size of less than about 5 μm, for example about 5, 4.8, 4.6, 4.4, 4.2, 4.0, 3.8, 3.6, 3.4, 3.2, 3.0, 2.8, 2.6, 2.4, 2.2, 2.0, 1.8, 1.6, 1.4, 1.2, or 1.0 μm or less; or less than about 2 μm, for example, about 1.8, 1.6, 1.4, 1.2, 1.0, 0.8, 0.6, 0.4, or 0.2 μm.

Annealing ZnS:Mn Precipitate

Once formed and optionally washed, a ZnS:Mn precipitate can optionally be annealed by contacting the precipitate with a quantity of a flux material and then heating the mixture. In various aspects, a flux material can comprise one or more of an alkali halide, such as, for example, sodium chloride. In another aspect, the ZnS:Mn precipitate and flux material can be contacted with a quantity of a manganese containing compound, such as, for example, manganese carbonate, manganese sulfide, manganese nitrate, or a combination thereof, prior to heating. In another aspect, the manganese containing compound does not introduce a new impurity into the phosphor material when heated. In one aspect, a manganese source, such as a manganese containing solution can be contacted during the formation of a precipitate. In another aspect, a manganese source can be contacted with a precipitate prior to heating. In yet another aspect, a manganese source can be contacted during the formation of a precipitate and again prior to heating. If one or more manganese sources are contacted at varying times, it is not necessary that the manganese sources comprise the same composition or concentration.

The amount of flux material contacted in an annealing step can vary and one of skill in the art could readily select an appropriate flux material. In one aspect, a flux material comprises from about 0.5 to about 4 wt. % of the mixture. The amount of a manganese containing compound can also vary, depending upon, for example, the manganese concentration in the precipitate prior to contacting. In various aspects, the target amount of manganese in a final phosphor, after annealing and heating, comprises from about 0.5 to about 2 wt. %.

In a specific aspect, about 10 g of dried ZnS:Mn precipitate can be contacted with about 0.2 g of NaCl and about 0.22 g of $MnCO_3$. In other aspects, the ZnS:Mn, NaCl, and $MnCO_3$ can be mixed to provide a uniform or substantially uniform mixture.

After contacting with NaCl and a manganese containing compound, the precipitate can be heated at a temperature and for a time sufficient to at least partially anneal the precipitate. In one aspect, the precipitate can be heated at a temperature and for a time sufficient to anneal all or substantially all of the precipitate. In a specific aspect, the precipitate or a portion thereof can be placed in a crucible and heated in air at about 850° C. for about 1 hour. In another aspect, a portion of the precipitate can be placed in a crucible, such as an alumina crucible, which can subsequently be placed in a larger crucible. A sacrificial component, such as a zinc sulfide powder, can be placed in the larger crucible, for example, between the inner and outer crucibles, to protect the precipitate in the smaller crucible from oxidation. In another aspect, the precipitate can be heated in an inert environment.

After heating and optionally allowing the annealed precipitate to cool, the annealed precipitate can be washed. One or more washing steps can be performed on the annealed precipitate to remove any remaining residues on the phosphor surface. In various aspects, a wash can comprise a deionized water wash, an acid wash, or a combination thereof In a specific aspect, an annealed precipitate is washed with a solution comprising hot deionized water and glacial acetic acid; followed by one or more deionized water washes to remove any remaining acid. In another aspect, a hydrochloric acid solution can be used to wash an annealed precipitate in addition to or in lieu of an acetic acid wash. In a specific aspect, an aqueous hydrochloric acid solution (pH 0.9 to 1.0) is used after an acetic acid wash. In one aspect, a wash solution comprising hot deionized water can be from about 40° C. to about 70° C. In other aspects, a wash solution can be less than about 40° C. or greater than about 70° C., and the present invention is not limited to any particular wash temperature. In another aspect, the amount of water present in a wash solution can be at least about 4 times the weight of the powder being washed, for example, about 4, 4.5, 5, 6, 7, 8, 9, 10, 20, 30, or 50 times the weight of the powder being washed. In other aspects, the amount of water can be less than about 4 times the weight of the powder being washed. In still another aspect, the amount of glacial acetic acid used in a wash solution can comprise from about 1 to about 25 wt. %, for example, about 1, 2, 3, 4, 5, 6, 7, 8, 9, 10, 11, 14, 17, 19, 21, 23, or 25 wt. %, based on the water weight; or from about 9 to about 11 wt. %, for example, 9, 9.5, 10, 10.5, or 11 wt. % based on the water weight of the wash solution. In other aspects, it should be appreciated that other concentrations and quantities of diluted acetic acid can be used to achieve a similar target concentration to those aspects recited herein.

The washed and annealed precipitate can be dried as described herein for the pre-annealed precipitate. For example, an annealed precipitate can be dried by exposure to air, heating in an oven or furnace, or by a freeze drying process.

An annealed precipitate, after washing, can, in various aspects, have a D50 particle size of less than about 5 μm, for example about 5, 4.8, 4.6, 4.4, 4.2, 4.0, 3.8, 3.6, 3.4, 3.2, 3.0, 2.8, 2.6, 2.4, 2.2, 2.0, 1.8, 1.6, 1.4, 1.2, or 1.0 μm or less; less than about 2 μm, for example, about 1.8, 1.6, 1.4, 1.2, 1.0, 0.8, 0.6, 0.4, or 0.2 μm; or less than about 1 μm, for example, about 0.8, 0.6, 0.4, or 0.2 μm. In a specific aspect, a washed, annealed precipitate has a D50 of about 1.67 μm.

The specific concentration of sodium chloride and manganese present in a washed and annealed phosphor can vary depending on the specific components and concentrations thereof used to prepare the phosphor. In various aspects, a phosphor can comprise from about 0 to about 2 wt. % sodium chloride and from about 2 to about 3 wt. % of a manganese compound, such as, for example, manganese carbonate. In a specific aspect, a phosphor material comprises about 1.1% wt. % manganese.

A precipitate or phosphor produced by the various methods of the present invention can, in various aspects, comprise no or substantially no copper. In various aspects, a precipitate and/or phosphor can comprise less than about 100 ppm, less than about 50 ppm, less than about 10 ppm, less than about 5 ppm, less than about 2 ppm, or no copper. In a preferred aspect, a precipitate and/or phosphor comprise no copper. As described herein, copper can be present in conventional phosphor materials to facilitate electroluminescent emission at lower operating voltages.

Applications

The ZnS:Mn phosphor of the present invention can be used in any suitable light emitting device, such as, for example, a thin-film electroluminescent lamp. In various aspects, the ZnS:Mn phosphor can be used alone and/or in combination with other phosphor materials to provide a specific emission color.

Although several aspects of the present invention have been described in the detailed description and accompanying drawings, it should be understood that the invention is not limited to the aspects disclosed, but is capable of numerous rearrangements, modifications and substitutions without departing from the spirit of the invention as set forth and defined by the following claims.

EXAMPLES

To further illustrate the principles of the present invention, the following examples are put forth so as to provide those of ordinary skill in the art with a complete disclosure and description of how the glass compositions, articles, devices, and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1

Preparation of $ZnSO_4$ Stock Solution

In a first example, a zinc sulfate stock solution was prepared by adding 246.6 g of ZnO to 1.5 L of cold deionized water. While agitating, 314.0 g of concentrated sulfuric acid ($H_2SO_4$) was then added slowly. After addition of the sulfuric acid, the mixture was agitated for an additional 30 minutes and then diluted to a final weight of 2505 g.

Example 2

Preparation of $MnSO_4$ Stock Solution

In a second example, a manganese sulfate stock solution was prepared by dissolving 9.22 g of $MnSO_4·H_2O$ crystals in 250.78 g of cold deionized water.

Example 3

Precipitation of ZnS:Mn

In a third example, ZnS:Mn was precipitated by dissolving 19.86 g of $Na_2S·xH_2O$ (x≈3.7) flakes in 475 g of hot deionized water, and then transferring the resulting solution into a 500 ml dispensing burette. Next, 128.0 g of the $ZnSO_4$ stock solution prepared in Example 1 was diluted to 510 g and then mixed with 13.00 g of the $MnSO_4$ stock solution prepared in Example 2. The resulting solution was transferred into a second 500 ml dispensing burette.

About 7 L of hot deionized water was placed in a 12 L glass container on a hot plate and heated to about 65-75° C. With agitation, each of the $Na_2S$ solution in the first burette and the $ZnSO_4/MnSO_4$ solution in the second burette were slowly added to the heated water in the 12 L glass container at a rate of between 4 to 5 ml per minute. Once the reaction was complete, the resulting solids were allowed to settle and the solution decanted. The precipitate was then washed with hot deionized water until the wash solution had a conductivity of less than 200 $\mu S·cm^{-1}$.

To facilitate faster settling and washing, a centrifuge was utilized during the washing procedure. The washed precipitate was then dried using a freeze dryer, typically for 24 to 48 hours.

Example 4

Annealing ZnS:Mn Precipitate

In a fourth example, a washed and dried ZnS:Mn precipitate was annealed. About 10 g of dried ZnS:Mn powder was mixed with 0.2 g of NaCl and 0.22 g of $MnCO_3$. The mixture was then placed into an alumina crucible, which was subsequently placed inside a larger crucible. About 2.5 g of sacrificial ZnS powder was placed in the larger crucible, between the two crucibles, to protect the contents from oxidation. The mixture was annealed in air at 850° C. for about 1 hour.

The annealed sample was then washed using a solution containing 250 g of hot deionized water and 25 g of glacial acetic acid, followed by hot deionized water washes to remove any remaining acid residue. The washed powder was then dried at 120° C. for 2 hours to form the final ZnS:Mn phosphor. The resulting phosphor had a D50 of 2.68 µm, 0.79% of manganese, and had an emission peak at 585 nm. The particle size distribution before and after annealing is illustrated in FIG. 1.

Example 5

Preparation of ZnS:Mn Phosphor

Figure 2:
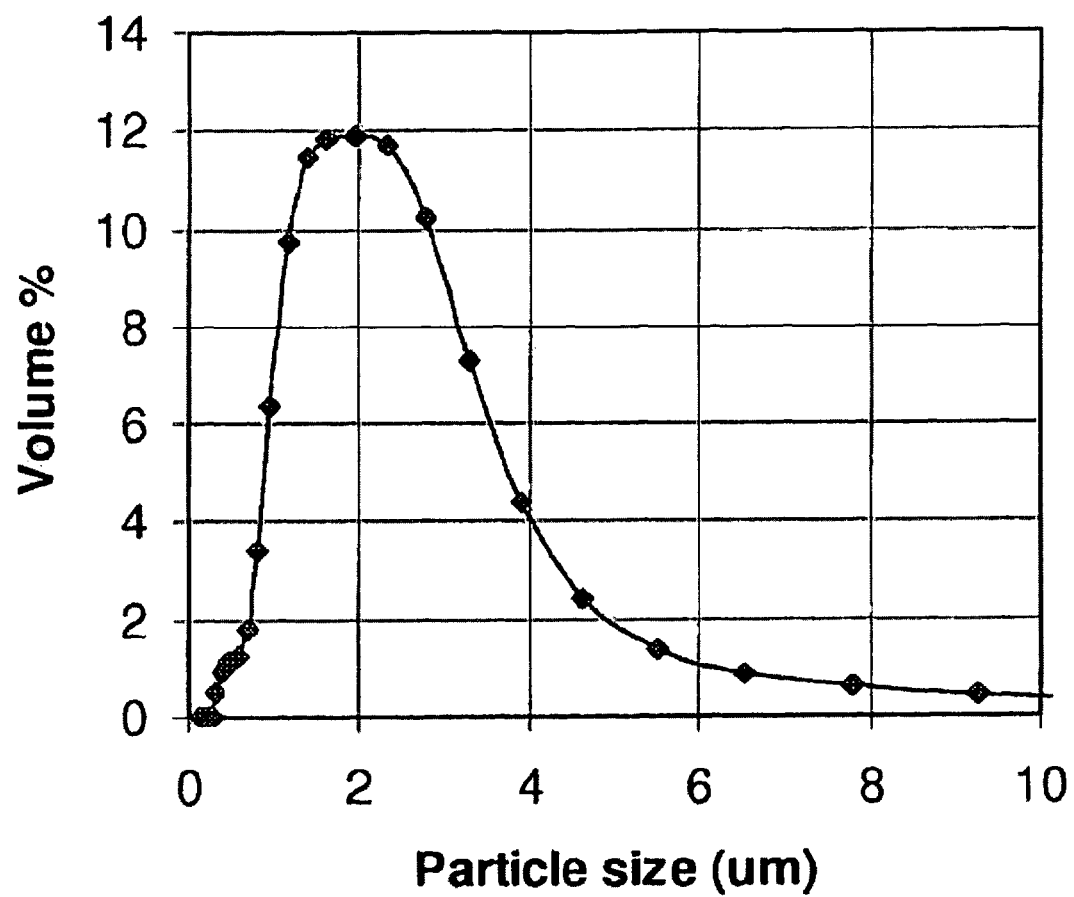
FIG. 2 is a graph of the particle size distribution after annealing for a precipitate prepared in Example 2, in accordance with various aspects of the present invention.

In a fifth example, another ZnS:Mn phosphor material was prepared by the method described in Example 4, except that: 1) in the annealing step, 0.22 g of MnS was used instead of 0.22 g of $MnCO_3$, and 2) after acetic acid washing, a hydrochloric acid wash (pH 0.9-1.0) was performed. The final phosphor material had a D50 of 1.67 µm and about 1.1% of manganese. The particle size distribution is shown in FIG. 2.

Throughout this application, various publications are referenced. The disclosures of these publications in their entireties are hereby incorporated by reference into this application in order to more fully describe the compositions, articles, device, and methods described herein.

Various modifications and variations can be made to the compositions, articles, devices, and methods described herein. Other aspects of the compositions, articles, devices, and methods described herein will be apparent from consideration of the specification and practice of the compositions, articles, devices, and methods disclosed herein. It is intended that the specification and examples be considered as exemplary.

What is claimed is:

1. A method for preparing a ZnS:Mn phosphor comprising the steps of:
   (a) contacting at least a portion of a first solution comprising a zinc salt and $Mn^{2+}$ with a second solution comprising sodium sulfide to produce a particle, washing and drying the particle, and mixing the dried precipitate with sodium chloride and a manganese compound; and then
   (b) heating the particle at a high temperature in air and for a time sufficient to form an orange-yellow emitting phosphor;

wherein no copper is present in any of the first solution, the second solution, or the manganese source.

2. The method of claim 1, wherein the first solution and the second solution are contacted and then heated prior to contacting with the sodium chloride and manganese compound.

3. The method of claim 1, wherein the first solution comprises a zinc sulfate.

4. The method of claim 1, wherein the first solution comprises a manganese sulfate.

5. The method of claim 1, wherein contacting in a) is performed at a rate sufficiently low to form ZnS:Mn precipitate particles having a D50 of less than about 5 μm.

6. The method of claim 1, wherein heating comprises annealing at a high temperature in air.

7. The method of claim 1, wherein contacting comprises reacting the first solution comprising $Zn^{2+}$ and $Mn^{2+}$ and the second solution comprising sodium sulfide to produce a particle.

* * * * *